(12) United States Patent
Tregoning et al.

(10) Patent No.: US 6,824,055 B2
(45) Date of Patent: Nov. 30, 2004

(54) SYSTEM AND METHOD FOR SECURING A SCANNER CARRIAGE

(75) Inventors: Michael A. Tregoning, Greeley, CO (US); Hwee-Kian Lim, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 20 days.

(21) Appl. No.: 10/405,336

(22) Filed: Apr. 1, 2003

(65) Prior Publication Data

US 2004/0195326 A1 Oct. 7, 2004

(51) Int. Cl.[7] .................................................. G06K 7/10
(52) U.S. Cl. ..................... 235/454; 358/396; 358/474; 206/1.5
(58) Field of Search .......................... 235/454; 358/400, 358/471, 474, 497; 403/396, 397; 206/1.5, 308.2

(56) References Cited

U.S. PATENT DOCUMENTS

| 5,767,977 | A | * | 6/1998 | Thelen et al. ............... 358/296 |
| 6,402,034 | B1 | | 6/2002 | Yeh |
| 2003/0231357 | A1 | * | 12/2003 | Johnson et al. ............ 358/484 |
| 2003/0234191 | A1 | * | 12/2003 | Belden et al. ........... 206/308.2 |
| 2004/0040349 | A1 | * | 3/2004 | Guttadauro et al. ......... 70/57.1 |

* cited by examiner

*Primary Examiner*—Jared J. Fureman
*Assistant Examiner*—Allyson N Trail

(57) ABSTRACT

In accordance with an embodiment of the present invention, a method comprises placing an image capture device into a packaging, inserting at least a portion of a locking insert into a housing of the image capture device through the packaging, and engaging the portion of the locking insert with a carriage disposed in the housing to substantially immobilize the carriage.

34 Claims, 3 Drawing Sheets

SYSTEM AND METHOD FOR SECURING A SCANNER CARRIAGE

TECHNICAL FIELD OF THE INVENTION

The present invention relates generally to the field of image capture devices, and more particularly to a system and method for securing a carriage of a scanner.

BACKGROUND OF THE INVENTION

Scanners are increasingly used to scan different types of objects, such as paper documents, photographs, negatives, transparencies, and/or the like, into electronic formats, which may be easily stored or transmitted. It is customary to provide a locking mechanism to lock or secure the scanner carriage disposed inside a housing of the scanner. The carriage is locked as a safety measure to prevent it from moving during transportation of the scanner. A user of the scanner is supposed to unlock the carriage before using the scanner. However, most users are not aware that the carriage has to be unlocked prior to use. Even if a user is aware that the carriage has to be unlocked, in their excitement to set up and use a newly acquired scanner, many users do not remember to unlock the carriage. Further, because the locking mechanism is typically located at a lower back or underneath the scanner, there is no readily visible reminder to the user to unlock the carriage before use when the scanner is in an upright position. Thus, the scanner is inoperable when the user attempts to use it.

Upon observing that the carriage of their newly acquired scanner is not moving, users may incorrectly believe that the scanner is faulty and call the manufacturer for assistance. Thus, the manufacturer has to respond to calls from the users about an otherwise-working product. This adds to the manufacturer's cost of doing business. Furthermore, if the user attempts to use the scanner before unlocking the carriage, a motor of the scanner which drives the carriage may become damaged due to overheating. Thus, the manufacturer may have to incur extra costs in either fixing or replacing the scanner.

SUMMARY OF THE INVENTION

In accordance with an embodiment of the present invention, a method comprising placing an image capture device into a packaging, inserting at least a portion of a locking insert into a housing of the image capture device through the packaging, and engaging the portion of the locking insert with a carriage disposed in the housing to substantially immobilize the carriage.

In accordance with another embodiment of the present invention, a scanning system comprises an image capture device inside a packaging, the image capture device comprising a housing adapted to accept at least a portion of a locking insert through the packaging and a carriage disposed in the housing and adapted to receive the at least a portion of the locking insert to limit movement of the carriage, the locking insert being automatically removable from the carriage upon removal of the image capture device from the packaging.

BRIEF DESCRIPTION OF THE DRAWINGS

For a more complete understanding of the present invention, the objects and advantages thereof, reference is now made to the following descriptions taken in connection with the accompanying drawings in which.

DESCRIPTION OF THE DRAWINGS

The preferred embodiment of the present invention and its advantages are best understood by referring to FIGS. 1 through 7 of the drawings, like numerals being used for like and corresponding parts of the various drawings.

For the sake of simplicity and convenience, the present invention will be described herein with reference to a scanner as one implementation of an image capture device. The teachings of the present invention may be used with respect to other types of image capture devices, such as photocopiers, facsimile machines, multi-function devices, printers, digital senders, and/or the like.

Figure 1A:
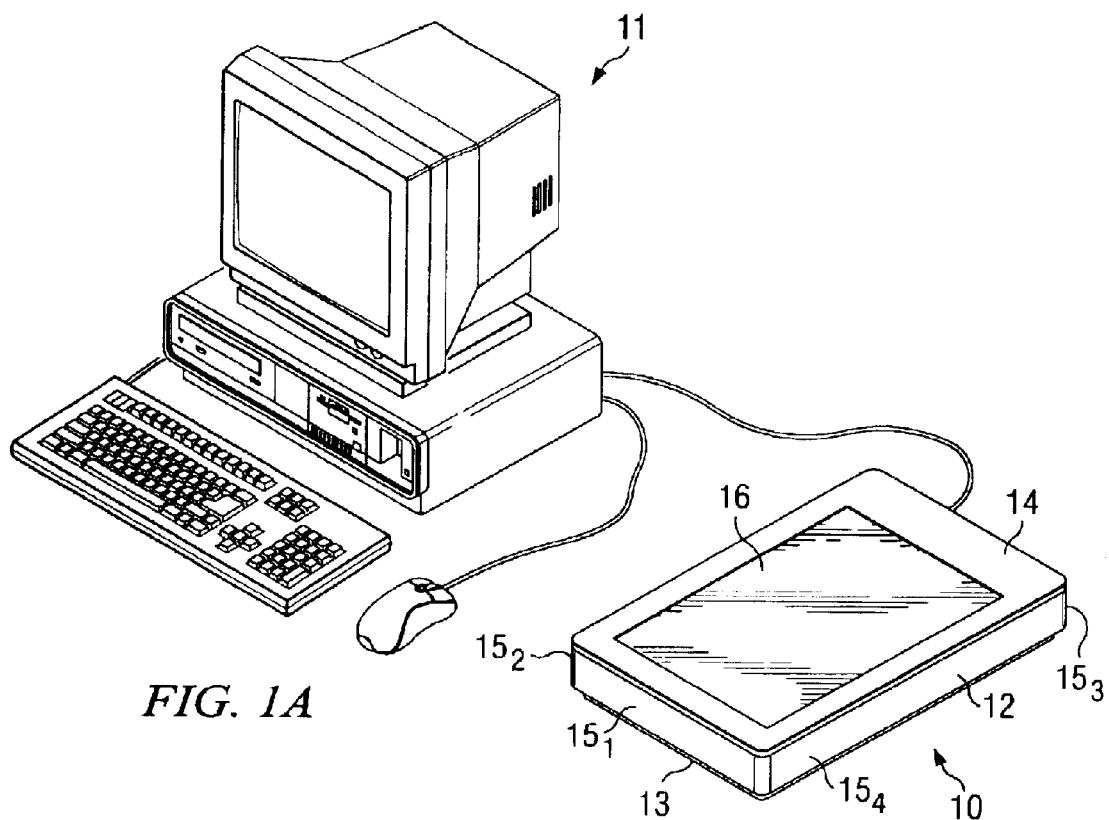
FIGS. 1A and 1B are perspective views of an image capture device which may use embodiments of the present invention to advantage.

FIG. 1A is a perspective view of an image capture device 10 in the form of a scanner, such as a flatbed scanner. If desired, image capture device 10 may be part of a copier, a multi-function device, a facsimile machine, or other machine that makes a digital image for storage, transmission or further processing. Scanner 10 comprises a housing 12. Housing 12 comprises a scanner base 13, a top surface 14 and a plurality of sides $15_1$, $15_2$, $15_3$ and $15_4$. Top surface 14 comprises a platen 16 against which an object to be scanned, such as a document, a photograph, a negative, a transparency, and/or other object, may be placed. If desired, scanner 10 may be coupled to a computer system 11 to facilitate control and operation of scanner 10.

Figure 1B:
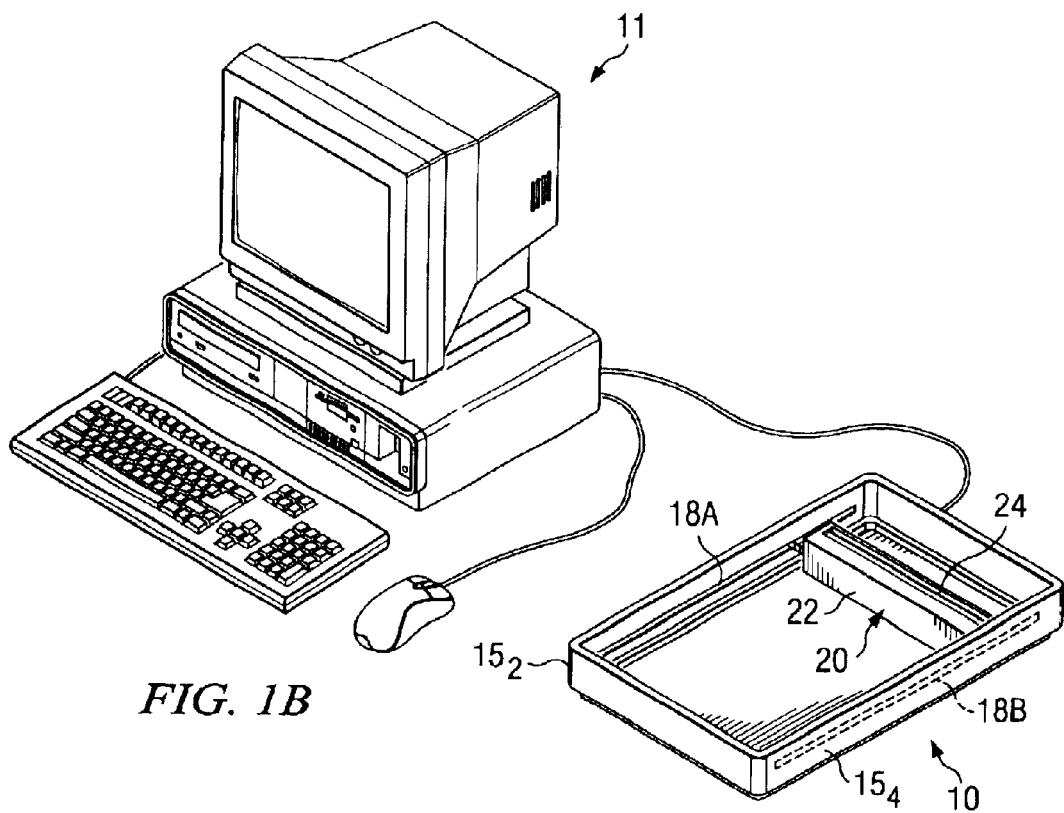

FIG. 1B is a perspective view of flatbed scanner 10 with top surface 14 removed. Preferably, one or more support rails 18A and 18B are disposed inside housing 12 along two opposing sides, for example sides 152 and 154 of housing 12. Support rails 18A and 18B support a scanner carriage 20 disposed in housing 12. Scanner carriage 20 is preferably removable from at least one of the support rails 18A and 18B. Scanner carriage 20 supports one or more scanning modules 22, which may include a light source 24, an internal optical system and a photosensitive device. Scanner carriage 20 is capable of moving along support rails 18A and 18B along a displacement path substantially parallel to support rails 18A and 18B.

Figure 1C:
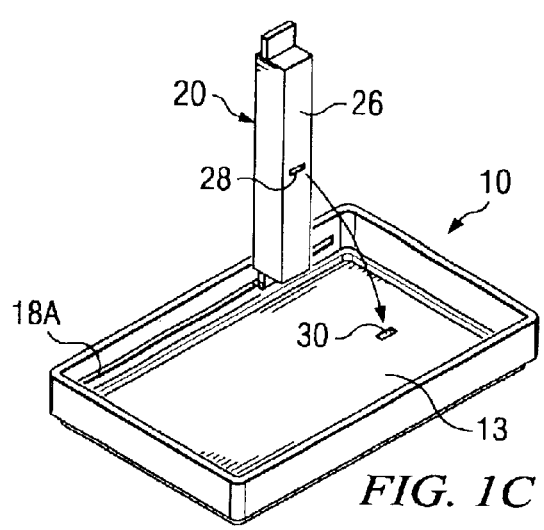
FIG. 1C is a perspective view of the image capture device of FIGS. 1A and 1B with a scanner carriage in a raised position in accordance with an embodiment of the present invention.
Figure 2A:
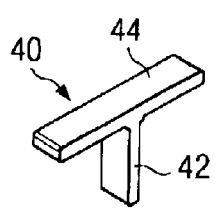
FIG. 2A is a perspective view.
Figure 2B:
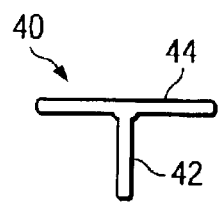
FIG. 2B is a front elevational view, of an exemplary locking insert in accordance with an embodiment of the present invention.

FIG. 1C is a perspective view of scanner 10 with scanner carriage 20 in a raised position. Scanner carriage 20 comprises a carriage base 26. Carriage base 26 preferably faces scanner base 13 and is adapted to engage with a locking insert 40 (FIGS. 2A and 2B). In the illustrated embodiment of FIG. 1C, carriage base 26 comprises at least one slot 28. Carriage slot 28 may be located anywhere along carriage base 26. Scanner base 13 is preferably adapted to permit locking insert 40 inserted from exterior to scanner 10 to pass through scanner housing 12 to engage with carriage slot 28 to substantially immobilize or limit the movement of scanner carriage 20. In the illustrated embodiment, scanner base 13 is adapted to include at least one slot 30. The position of housing slot 30 in scanner base 13 is such that when scanner carriage 20 is in a resting or home position, for example a horizontal position as shown in FIG. 1B, carriage slot 28 and housing slot 30 are aligned with each other such that at least a portion of locking insert 40 may pass through housing slot 30 to engage with carriage slot 28. In the illustrated embodiment, the position of housing slot 30 is such that an axis normal to scanner base 13 passes through both carriage slot 28 and housing slot 30. Carriage slot 28 and/or housing slot 30 may be of any shape depending on the shape of locking insert 40. In the illustrated embodiment, carriage slot 28 and housing slot 30 are both rectangular in shape. Although in the illustrated embodiment, both carriage slot 28 and housing slot 30 are of the same shape, if desired they may be of different shapes as long as both admit locking insert 40 therethrough. Carriage slot 28 and housing slot 30 may be round, square, oval, triangular, and/or the like.

If desired, housing slot 30 may be located on any of the sides $15_1$, $15_2$, $15_3$, or $15_4$, of scanner 10. Similarly, if desired, carriage slot 28 may be located on any of the sides of carriage 20 facing housing slot 30.

Figure 1D:
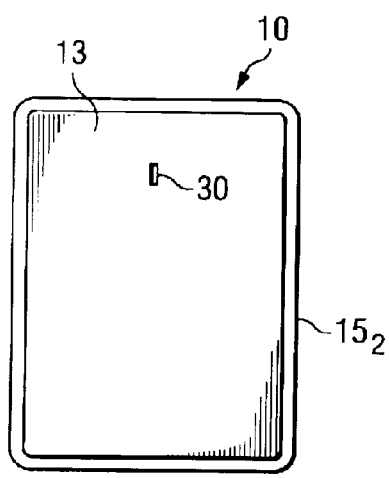
FIG. 1D is a plan view showing the base of the image capture device of FIGS. 1A and 1B in accordance with an embodiment of the present invention.

FIG. 1D is a plan view showing base 13 of scanner 10. In the illustrated embodiment, slot 30 in scanner base 13 is oriented along an axis parallel to side $15_2$ of scanner housing 12. However, the invention is not so limited and housing slot 30 may be oriented in any direction. In the illustrated embodiment, scanner base 13 comprises only one slot 30. Multiple slots may be provided in scanner base 13 so that, if desired, carriage 16 may be locked at different positions along its displacement path.

FIG. 2A is a perspective view, and FIG. 2B is a front elevational view, of an exemplary locking insert 40 in accordance with an embodiment of the present invention. Prior to the present invention, locking inserts were formed as an integral part of the housing of the scanner. Because of this and the location of the locking insert, users did not realize that the locking insert had to be moved to an unlocked position prior to using the scanner.

Locking insert 40 of FIGS. 2A and 2B is T-shaped. In accordance with an embodiment of the present invention, locking insert 40 is preferably separate or independent from scanner 10. When not being used to lock scanner carriage 20, locking insert 40 is preferably not connected or attached to scanner 10. Locking insert 40 comprises a locking portion 42 and a support portion 44 which are substantially orthogonal to each other. Locking portion 42 is coupled to support portion 44 and is capable of passing through housing slot 30 of scanner base 13 to engage with carriage slot 28 of carriage base 26. Locking portion 42 forms a sufficiently tight fit with carriage slot 28 and/or housing slot 30 so that locking insert 40 does not inadvertently slip out.

Figure 4A:
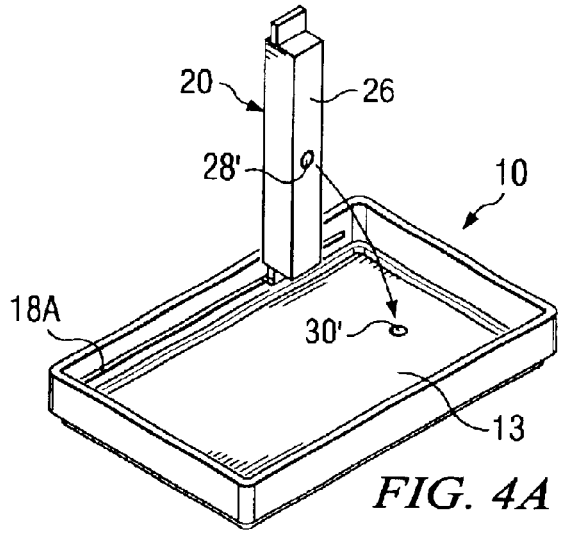
FIG. 4A is a perspective view of the image capture device of FIGS. 1A and 1B with the scanner carriage in a raised position in accordance with an alternative embodiment of the present invention.
Figure 4B:
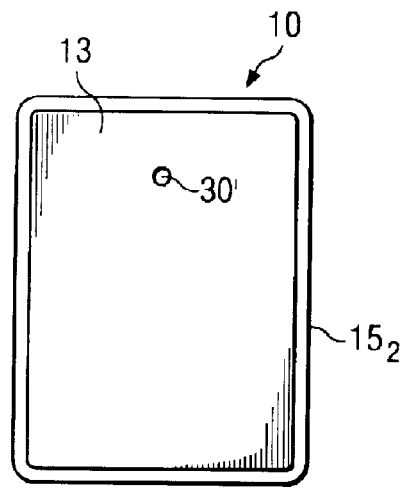
FIG. 4B is a plan view showing the base of the image capture device of FIGS. 1A and 1B in accordance with an alternative embodiment of the present invention.
Figure 5:
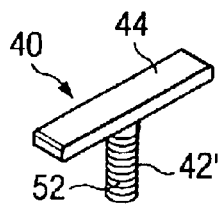
FIG. 5 is a perspective view of an exemplary locking insert in accordance with an alternative embodiment of the present invention.
Figure 7:
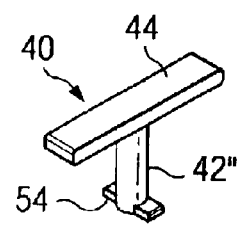
FIG. 7 is a perspective view of an exemplary locking insert in accordance with an alternative embodiment of the present invention.

In the illustrated embodiment, locking portion 42 is rectangular in shape so that it may easily interface with carriage slot 28 and housing slot 30, which are of similar shape. If desired, locking portion 42 may be of any shape, for example cylindrical. An external surface of locking portion 42 is substantially smooth. However, if desired, and as illustrated in FIG. 5, the external surface of locking portion 42' may be adapted to include a plurality of threads 52. In such an embodiment, an internal surface of carriage slot 28 and/or housing slot 30 may be adapted to include complementary threads so that when locking portion 42 is inserted into carriage slot 28 and/or housing slot 30 through packaging 46 (FIG. 3) and rotated, it may couple with carriage slot 28 and/or housing slot 30 thereby locking scanner carriage 20. In such an embodiment, locking portion 42 is preferably cylindrical (FIG. 5) and carriage slot 28' and housing slot 30' are preferably circular (FIGS. 4A and 4B).

Figure 6A:
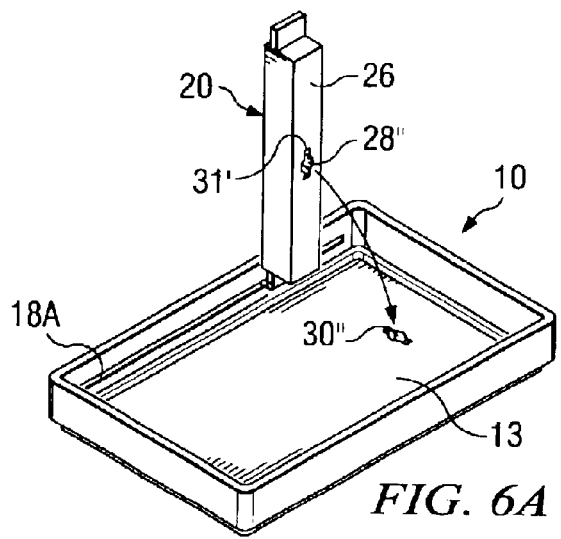
FIG. 6A is a perspective view of the image capture device of FIGS. 1A and 1B with the scanner carriage in a raised position in accordance with an alternative embodiment of the present invention.
Figure 6B:
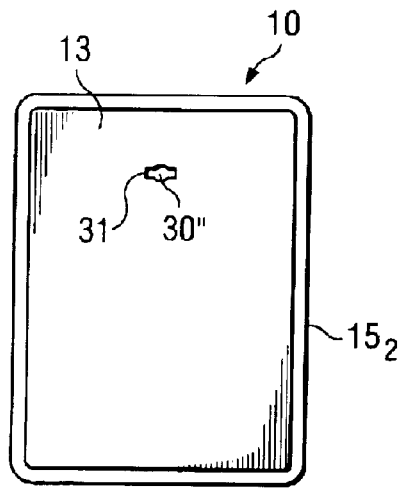
FIG. 6B is a plan view showing the base of the image capture device of FIGS. 1A and 1B in accordance with an alternative embodiment of the present invention.

In the embodiment illustrated in FIGS. 6A and 6B, a housing slot 30" include a substantially rectangular slit 31 and a carriage slot 28" includes a substantially rectangular slit 31', to accommodate an engaging portion 54 (FIG. 7), which may be part of locking insert 40. Engaging portion 54 may be located anywhere along locking portion 42" (FIG. 7) of locking insert 40. A longitudinal axis of engaging portion 54 is substantially orthogonal to a longitudinal axis of locking portion 42". The dimensions of slits 31 and 31' are such that engaging portion 54 may be inserted through it, if desired. In such an embodiment, engaging portion 54 of locking portion 42" may be aligned with slit 31 prior to insertion of locking portion 42" into housing slot 30". Once inserted into carriage slot 28" through housing slot 30", locking insert may be rotated so that slit 31' and engaging portion 54 are no longer aligned with each other, thereby reducing the possibility of locking insert 40 inadvertently disengaging from carriage slot 28". Slits 31 and 31' are preferably aligned with each other so that it is easier to insert engaging portion 54 through both slits 31 and 31'. However, if desired, they may not be aligned with each other. Furthermore, if desired, in an alternative embodiment, carriage slot 28" may be substantially circular without any slit in it. This is advantageous when engaging portion 54 is located along the length of locking portion 42" and not at an end of locking portion 42".

Figure 3:
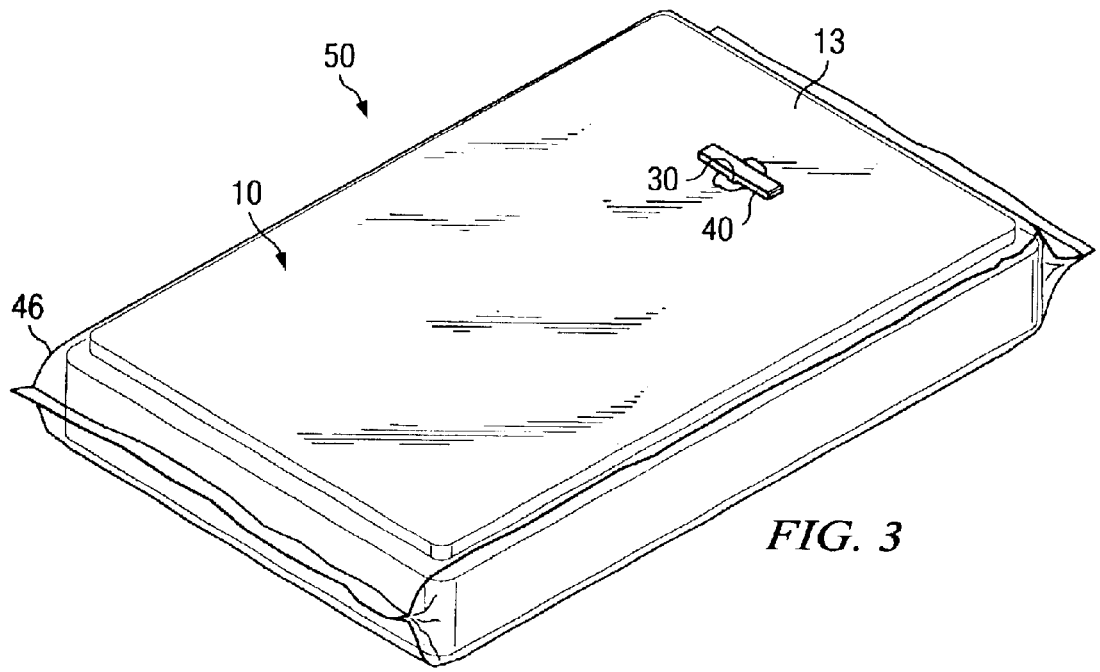
FIG. 3 is a perspective view of an image capture device with the locking insert of FIG. 2A or 2B coupled to the image capture device.

FIG. 3 is a perspective view showing base 13 and two sides of a scanning system 50 with locking insert 40 coupled to image capture device 10. In the embodiment of FIG. 3, image capture device 10 is shown inside packaging 46. Packaging 46 preferably includes a small opening. The location of the small opening on packaging 46 is such that when scanner 10 is inside packaging 46, it is substantially aligned with housing slot 30 in scanner base 13. However, it is not required that packaging 46 have an opening.

In accordance with an embodiment of the present invention, in order to lock scanner carriage 20, scanner 10 is placed inside packaging 46. If packaging 46 has an opening, then the opening in packaging 46 is aligned with slot 30 in scanner base 13. Locking portion 42 of locking insert 40 is inserted into housing slot 30 through the opening in packaging 46. If packaging 46 does not have an opening, then locking portion 42 of locking insert 40 is simply inserted into housing slot 30 through packaging 46. Locking portion 42 passes through housing slot 30 and engages with slot 28 of carriage base 26, thereby locking scanner carriage 20. In this position, support portion 44 of locking insert 40 rests on scanner base 13 such that at least a portion of packaging 46 is in between support portion 44 and scanner base 13.

Locking insert 40 may be affixed to packaging 46, for example by placing a tape over support portion 44 and the portion of packaging 46 surrounding support portion 44. Once scanner carriage 20 is locked or secured, scanner 10 may be moved around or shipped without disturbing the position of carriage 20. In order to unlock carriage 20, packaging 46 is simply removed from scanner 10. Because locking insert 40 is affixed to packaging 46, locking insert 40 disengages from slot 28 in carriage base 26 and from slot 30 in scanner base 13, thereby unlocking carriage 20. An advantage of this embodiment of the present invention is that in order to unlock scanner carriage 20, the user need not be aware that carriage 20 is locked. Furthermore, it requires no or very little extra effort on the part of the user to unlock carriage 20. Locking insert 40 is automatically removed from scanner 10 and carriage 20 automatically unlocked when scanner 10 is removed from packaging 46.

If desired, in order to lock carriage 20, for example for later transportation, locking insert 40 may be inserted back into housing slot 30 and carriage slot 28 without first placing scanner 10 in packaging 46.

In accordance with an alternative embodiment of the present invention, locking portion 42 may be adapted to include threads on its external surface and carriage slot 28 and/or housing slot 30 includes complementary threads on their internal surface. In such an embodiment, scanner 10 is placed inside packaging 46. If packaging 46 has an opening, then the opening in packaging 46 is aligned with slot 30 in scanner base 13 and locking portion 42 of locking insert 40 is inserted in housing slot 30 through the opening in packaging 46. If packaging 46 does not have an opening, then locking portion 42 of locking insert 40 is simply inserted into housing slot 30 through packaging 46. Locking insert 40 is rotated to pass locking portion 42 through housing slot 30 and to engage at least a portion of locking portion 42 with slot 28 of carriage base 26 thereby locking carriage 20. If desired, support portion 44 may be used to rotate locking insert 40.

In this embodiment, it is desirable that support portion 44 of locking insert 40 be large enough so that when locking insert 40 is inserted in housing slot 30 to lock scanner carriage 20, support portion 44 covers at least a portion of packaging 46 surrounding the opening to prevent scanner 10 from being removed from packaging 46 without first disengaging locking insert 40 from carriage 20. In order to unlock scanner carriage 20, locking insert 40 may be rotated in the opposite direction to disengage locking insert 40 from carriage slot 28 and/or housing slot 30. Locking insert 40 may then be removed from scanner 10. An advantage of this embodiment of the present invention is that it is simple to use. Furthermore, by preventing scanner 10 from being removed from packaging 46 without unlocking the carriage, the user may be made aware of the fact that the scanner carriage has to be unlocked prior to using the scanner.

In accordance with another alternative embodiment, in order to lock scanner carriage 20, locking portion 42 of locking insert 40 is inserted into housing slot 30 of scanner 13 prior to placing scanner 10 inside packaging 46. Locking portion 42 passes through housing slot 30 and engages with slot 28 of carriage base 26, thereby locking scanner carriage 20. In this position, support portion 44 of locking insert 40 rests on scanner base 13. Because locking insert 40 may inadvertently disengage from carriage slot 28 thereby releasing carriage 20, it is desirable to better secure locking insert 40. To prevent scanner carriage 20 from being inadvertently unlocked, locking insert 40 may be affixed to scanner base 13, for example by placing a tape over support portion 44 and the portion of scanner base 13 surrounding support portion 44. Scanner 10 may then be placed inside packaging 46 for shipping. In order to unlock scanner carriage 20, the tape and locking insert 40 are simply removed from carriage slot 28 and housing slot 30. An advantage of this embodiment of the present invention is that packaging is not required to lock scanner carriage 20. Another advantage of using locking insert 40 to lock carriage 20 by using a tape is that it is simple to lock and/or unlock the carriage. Locking insert 40 may be removed by simply removing the tape from locking insert 40 and scanner base 13 thereby unlocking carriage 20.

In accordance with another alternative embodiment of the present invention, locking portion 42 may be adapted to include threads on its external surface and carriage slot 28 and/or housing slot 30 may be adapted to include complementary threads on their internal surface. In such an embodiment, in order to lock scanner carriage 20, locking portion 42 of locking insert 40 may be inserted in slot 30 of scanner base 13 prior to placing scanner 10 inside packaging 46. Locking insert 40 may then be rotated to pass locking portion 42 through housing slot 30 into carriage slot 28 of carriage base 26, thereby locking carriage 20. If desired, support portion 44 may be used to rotate locking insert 40. In this position support portion 44 of locking insert 40 rests on scanner base 13. Scanner 10 may then be placed inside packaging 46 for shipping. In order to unlock scanner carriage 20, locking insert 40 may be rotated to disengage locking insert 40 from carriage slot 28 and/or housing slot 30. Locking insert 40 may then be removed from scanner 10. An advantage of this embodiment of the present invention is that it is simple to use. Furthermore, packaging is not required to lock scanner carriage 20.

An advantage of an exemplary embodiment of the present invention is that is easy to use. In order to unlock the scanner carriage, the user need not be aware that the carriage is locked. Furthermore, it requires no or very little extra effort on the part of the user to unlock the carriage. Another advantage of an exemplary embodiment of the present invention is that the carriage is automatically unlocked when the scanner is removed from the packaging.

What is claimed is:

1. A method comprising:

placing an image capture device into a packaging;

inserting at least a portion of a locking insert into a housing of said image capture device through said packaging; and engaging said portion of said locking insert with a carriage disposed in said housing to substantially immobilize said carriage.

2. The method of claim 1, further comprising affixing another portion of said locking insert to at least a portion of said packaging to facilitate automatic removal of said locking insert from said carriage upon removal of said image capture device from said packaging.

3. The method of claim 1, said carriage adapted to receive said portion of said locking insert.

4. The method of claim 1, said housing adapted to accept said portion of said locking insert.

5. The method of claim 1, wherein said inserting comprises inserting said at least a portion of said locking insert into a housing slot of said housing.

6. The method of claim 5, wherein said engaging comprises engaging said at least a portion of said locking insert with a carriage slot in said carriage.

7. The method of claim 1, further comprising aligning an opening of said packaging with a housing slot of said housing.

8. The method of claim 7, wherein said inserting comprises inserting said at least a portion of said locking insert into said housing slot through said opening.

9. The method of claim 1, wherein said inserting comprises inserting said at least a portion of said locking insert into a housing slot of said housing.

10. The method of claim 1, wherein said inserting comprises inserting said at least a portion of said locking insert into a housing slot of said housing through said packaging.

11. The method of claim 1, wherein said engaging comprises engaging said at least a portion of said locking insert with a carriage slot in said carriage such that at least a portion of said packaging is disposed between said housing and at least another portion of said locking insert.

12. The method of claim 1, wherein said inserting comprises inserting said at least a portion of said locking insert into a selected one of a plurality of housing slots of said housing to lock said carriage at a respective desired location along a displacement path of said carriage.

13. The method of claim 2, further comprising inserting said at least a portion of said locking insert through said packaging such that at least a portion of said packaging is disposed between said housing and said another portion of said locking insert.

14. A scanning system, comprising:
an image capture device inside a packaging, said image capture device comprising:
a housing adapted to accept at least a portion of a locking insert through said packaging; and
a carriage disposed in said housing and adapted to receive said at least a portion of said locking insert to limit movement of said carriage, said locking insert being automatically removable from said carriage upon removal of said image capture device from said packaging.

15. The scanning system of claim 14, wherein said carriage comprises at least one carriage slot operable to receive said at least a portion of said locking insert.

16. The scanning system of claim 15, wherein said at least one carriage slot is aligned with at least one housing slot in said housing.

17. The scanning system of claim 15, wherein said locking insert is operable to pass through said packaging and at least one housing slot in said housing to engage with said at least one carriage slot.

18. The scanning system of claim 14, wherein a base of said housing comprises at least one housing slot operable to accept said at least a portion of said locking insert.

19. The scanning system of claim 14, wherein a base of said carriage comprises at least one carriage slot operable to receive said at least a portion of said locking insert.

20. The scanning system of claim 14, wherein said housing comprises a plurality of housing slots, each of said plurality of housing slots operable to accept said at least a portion of said locking insert.

21. The scanning system of claim 20, wherein each of said plurality of housing slots facilitates locking of said carriage in a different location along a displacement path of said carriage than any other of said plurality of housing slots.

22. The scanning system of claim 14, wherein said packaging comprises an opening through which said portion of said locking insert passes.

23. The scanning system of claim 14, wherein at least a portion of said packaging is disposed between said housing and another portion of said locking insert.

24. The scanning system of claim 14, wherein said locking insert is adapted to be inserted into said image capture device to limit movement of said carriage.

25. The scanning system of claim 14, wherein said locking insert comprises a locking portion operable to be inserted into a housing slot of said housing, at least a portion of said locking portion further operable to be inserted into a carriage slot of said carriage.

26. The scanning system of claim 25, wherein said locking insert further comprises a support portion substantially orthogonal to said locking portion.

27. The scanning system of claim 14, wherein said locking insert comprises a locking portion, at least a portion of said locking insert adapted to include a plurality of threads.

28. The scanning system of claim 15, wherein said locking insert comprises a locking portion, at least a portion of said locking insert adapted to include a plurality of threads, said plurality of threads operable to interface with complementary threads on an internal surface of said carriage slot.

29. The scanning system of claim 15, wherein a shape of a cross-section of said at least one carriage slot and said at least a portion of said locking insert is circular.

30. The scanning system of claim 16, wherein a shape of a cross-section of said at least one housing slot and said at least a portion of said locking insert is rectangular.

31. A method comprising removing an image capture device from a packaging thereby causing automatic removal of a locking insert engaged with a carriage disposed in a housing of said image capture device, from said image capture device.

32. The method of claim 31, said carriage of said image capture device being adapted to receive at least a portion of said locking insert.

33. The method of claim 31, said housing of said image capture device being adapted to accept at least a portion of said locking insert.

34. The method of claim 31, further comprising engaging at least a portion of said locking insert with said carriage to substantially immobilize said carriage after said automatic removal of said locking insert.

* * * * *